United States Patent [19]

Brandis et al.

[11] Patent Number: 4,819,564
[45] Date of Patent: Apr. 11, 1989

[54] LINEAR MOTOR DRIVEN CONVEYING INSTALLATION AND BRAKING DEVICE THEREFOR

[75] Inventors: Curt Brandis, Bremen; Heinrich Schulze-Buxloh, Werl-Hilbeck; Siegfried Pirags, Hamm, all of Fed. Rep. of Germany

[73] Assignee: Maschinenfabrik Scharf GmbH, Hamm, Fed. Rep. of Germany

[21] Appl. No.: 127,510

[22] Filed: Dec. 1, 1987

[30] Foreign Application Priority Data

Dec. 3, 1986 [DE] Fed. Rep. of Germany ....... 3641326

[51] Int. Cl.$^4$ .................... B60L 13/04; B60T 13/02
[52] U.S. Cl. .................... 104/292; 104/250; 188/38.5; 188/173
[58] Field of Search ............ 104/288, 290, 292, 249, 104/252, 250, 251, 259, 295, 307, 282, 284, 294; 188/171, 38.5, 33, 35, 173; 318/38, 135, 687

[56] References Cited

U.S. PATENT DOCUMENTS

| | | | |
|---|---|---|---|
| 573,823 | 12/1896 | Leffler | 104/292 X |
| 3,503,471 | 3/1970 | Balke | 104/249 X |
| 3,610,372 | 10/1971 | Warren | 104/249 X |
| 3,616,762 | 11/1971 | Benner | 104/290 X |
| 3,631,809 | 1/1972 | Reece | 104/294 |
| 4,348,961 | 9/1982 | Rohrbach | 104/249 X |
| 4,709,639 | 1/1987 | Geais | 104/290 X |

FOREIGN PATENT DOCUMENTS

| | | | |
|---|---|---|---|
| 918167 | 8/1954 | Fed. Rep. of Germany | 104/249 |
| 22065 | 10/1961 | German Democratic Rep. | 188/38.5 |

Primary Examiner—Johnny D. Cherry
Assistant Examiner—Joseph D. Pape
Attorney, Agent, or Firm—Toren, McGeady & Associates

[57] ABSTRACT

A conveying installation with a linear motor drive including a stator placed along a travel path and at least one conveyor unit guided along the stator in a constrained manner. The stator is divided into a plurality of stator portions. To each stator portion is assigned a braking device whose operation is dependent upon the current supply to a stator. The conveyor units are guided spaced apart by a predetermined distance. If the current supply fails, the braking devices are actuated and stop the movements of the conveyor units.

10 Claims, 4 Drawing Sheets

LINEAR MOTOR DRIVEN CONVEYING INSTALLATION AND BRAKING DEVICE THEREFOR

BACKGROUND OF THE INVENTION

1. Field of the Invention

The present invention relates to a conveying installation with a linear motor drive which includes a stator placed along a travel path and at least one conveyor unit with at least one permanent magnet, wherein the conveyor unit is guided along the stator in a constrained manner.

2. Description of the Prior Art

A conveying installation of this type can be operated above ground as well as below ground. As a rule, several conveyor units travel on the travel path. The movement of the conveyor units is controlled by a computer. The spacing between the conveyor units is predetermined by local conditions. The conveyor units may be guided in a sliding manner or on rollers. The guidance of the conveyor units may be effected on the stator or on a separate guide rail which may form the travel path.

The control of the speed of the conveyor units and the spacing between the conveyor units does not pose a problem as long as no failures, for example, power failure or computer failure, occur. However, particularly in the case of power failure or computer failure, difficulties may occur in the sequential movement of conveyor units which may have the result that the conveyor units run up against each other. The danger exists especially along outwardly or downwardly inclined travel paths in mining operations below ground.

In order to prevent this potential danger, it would be conceivable to install brakes in the conveyor units. However, it is difficult to install these brakes because the conveyor units themselves do not have their own energy supplies and, thus, after the conveyor units have been stopped, a further movement of the units is only possible after the brakes of the conveyor units have been manually or by means of an independent energy source been switched back from the braking position into the operating position.

It is, therefore, the primary object of the present invention to improve the conveying installation described above in such a way that a conveyor unit cannot be moved in an uncontrolled manner along the travel path even if unforeseeable problems occur, particularly with respect to the electrical energy supplied to the stator.

SUMMARY OF THE INVENTION

In accordance with the present invention, the stator of the conveying installation is divided into a plurality of stator portions. To each stator portion is assigned at least one stationary braking device which interacts with braking surfaces of the conveyor unit.

An important aspect of the present invention resides in the fact that the stator or travel path is divided into portions. As is known from conveying systems with sequential conveyance of carriages, the various stator portions are mutually monitored. As a result, and due to the presence of braking devices in each stator portion, it can be ensured that a conveyor unit will be moved in the event of a failure at most only to the next braking device, because this braking device will stop the movement of the conveyor unit. The conveyor unit is automatically stopped as long as the failure continues, so that none of the conveyor units can be moved along the travel path during a failure. The braking devices may be arranged at any point in longitudinal direction of each stator portion.

In accordance with a preferred embodiment of the present invention, the length of each stator portion is smaller than the minimum spacing between conveyor units which minimum spacing is determined by the local conditions.

Particularly in the sequential movement of conveyor units, the danger exists that in case of a failure the conveyor units will bump into each other, particularly along the inclined or downwardly inclined travel paths. As a result, if the conveyor units are used for the transport of persons, persons may be injured and, if the conveyor units are used for conveying material, the material may be damaged. Since, in accordance with the present invention, the length of the stator portions is now smaller than the minimum spacing between conveyor units as predetermined by local conditions, always only one conveyor unit is present between two successive braking devices. Accordingly, in the case of a problem, for example, a power failure, each conveyor unit can only be moved to the next braking device. This is true for both directions of travel.

Since problems in the conveying operation are in most cases due to a failure of the current supply to the stator, a feature of the present invention provides that the operation of the braking devices is directly dependent upon the current supply to the stators. Accordingly, the braking devices remain always in operating condition as long as current is supplied to the stators. When the current supply is interrupted, the braking devices are engaged and the conveyor units are stopped.

Of course, it is also possible to operate the brakes in a manner which is independent from the current supply.

In accordance with another feature of the present invention, each braking device includes at least one brake shoe which is operated by means of a brake cylinder. In the initial or operating position, the brake shoe has such a distance from the brake surfaces of the conveyor units on the travel paths that the conveyor units can move freely. In case of a problem, the brake shoes are shifted in the direction toward the conveyor units and come into contact with the brake surfaces of the conveyor units, so that the conveyor units are stopped.

In order to ensure a symmetrical load on the braking devices and on the conveyor units when braking is performed, advantageously two brake shoes are provided for each braking device. These two brake shoes are arranged so that they make contact on opposite sides of the conveyor units in the manner of tongs. The two brake shoes may be operated by only one brake cylinder. However, each brake shoe may also be coupled to a separate brake cylinder.

If only one cylinder is used, this brake cylinder is preferably arranged in a floating manner. In this case, a brake shoe each is hinged to the free end of the cylinder housing and to the free end of the piston rod. It is advantageous in this situation to arrange the brake cylinder underneath the stator or travel path.

When two brake cylinders are used, the piston rods of the these cylinders may be connected to the brake shoes. Also in this case, the brake cylinders are advantageously arranged in axial alignment transversely underneath the stator or travel path.

However, in accordance with another embodiment, the brake cylinder may also be arranged laterally next to the stator or travel path.

However, in accordance with another embodiment, the brake cylinder may also be arranged laterally next to the stator. In this case, each brake cylinder acts through two levers with brake shoes on the ends of the levers on a brake surface which extends horizontally between the brake shoes.

In accordance with a preferred feature of the present invention utilizing a horizontal brake cylinder, the brake shoe is hinged to the upper end of a two-arm brake lever whose lower end is hinged to the brake cylinder. In this manner, the brake surfaces can be provided on the sides of the conveyor units and the brake cylinders may be arranged in the travel path underneath the conveyor units. When a braking operation is carried out, the brake shoes act in the manner of tongs on the conveyor units and thus, the load is supplied symmetrically.

In accordance with another feature of the invention, the brake shoe is supported by a spring on the upper end of the brake lever. As a result, tolerances of the braking devices and the conveyor units are compensated. In addition, a smooth initiation of tee braking procedure is ensured.

However, this result can also be achieved if the member connecting the brake lever and the brake cylinder is a resiliently yielding member.

In accordance with a further development of the invention, the housing of the brake cylinder may be arranged so as to be pivotable about a horizontal axis. As a result, the brake cylinder is able to follow the pivoting movements of the brake lever. The lever is preferably arranged so as to be supported in the middle thereof. If the brake lever is supported eccentrically, it is additionally possible to take into account in an optimum manner the ratio of transmission of power arm-/load arm. These advantages are obtained when the stator is arranged underneath the brake cylinders as well as when the brake cylinders are arranged laterally next to the stator.

The selection of the type of brake cylinders to be used in the braking devices is essentially of minor significance. It is only necessary to ensure that for a problem-free conveying operation, the braking devices are safely maintained in the initial or operating position. For example, hydraulically or pneumatically operated brake cylinders may be used. The braking cylinders may be actuated from one side or both sides. If they are actuated from one side, the actuation usually takes place against the restoring force of at least one spring.

In accordance with another feature of the present invention, the braking cylinder is electrically actuated against the restoring force of a spring. Accordingly, when an appropriate control is used, the stator can relatively easily be coupled to the brake cylinders.

Instead of electrically actuated brake cylinders, it is also possible to place each brake shoe of the braking devices under the influences of magnets. If magnets are used, it is advantageous, as is the case in the above-described brake cylinders, to apply the braking force by means of mechanical energy. However, the displacement of the braking devices into the initial operating position should be effected by means of the energy which is used for actuating the braking cylinders or the magnets.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figure 1:
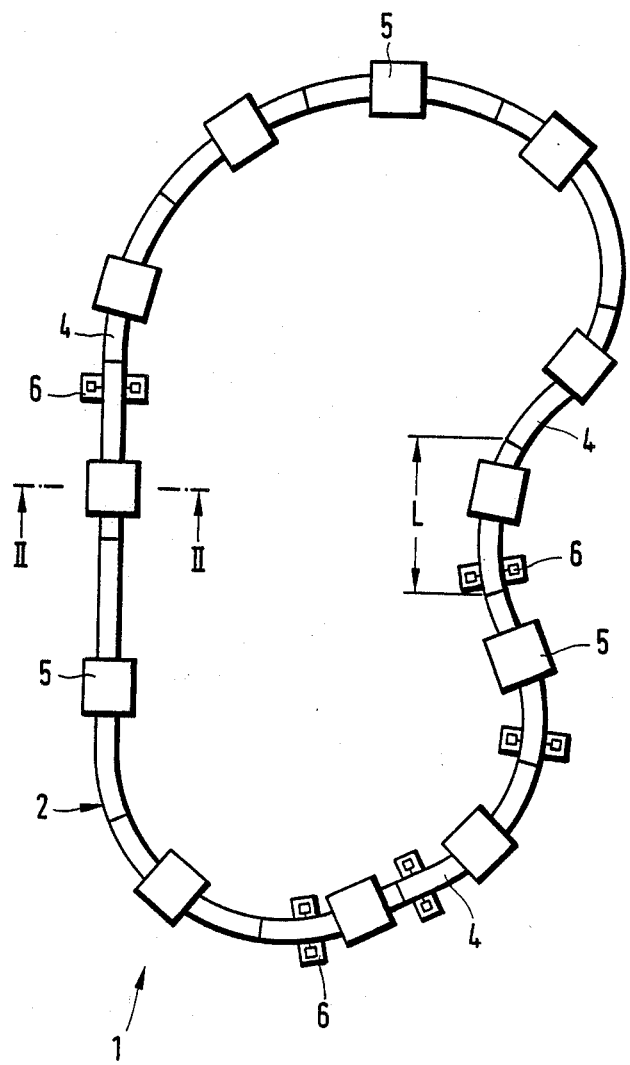
FIG. 1 is a schematic plan view of a conveying installation with linear motor drive according to the present invention.

The conveying installations in accordance with the present invention illustrated in FIGS. 1–4 are denoted by reference numeral 1. The conveying installations 1 may be used, for example, in an automobile factory.

The conveying installations 1 include a stator 2 supplied by electric current. The stator 2 is placed along a travel path 3 for conveyor units 5, 5a. In the illustrated embodiments, travel path 3 is formed by a concrete path. It is also conceivable that the conveyor units are guided on rails. Stator 2 is directed into several stator portions 4. The stator portions 4 are mutually electrically monitored in the conventional manner. The lengths L of each stator portion 4 is smaller than the minimum spacing between conveyor units 5, 5a which is determined by local conditions. Each stator portion 4 includes at least one braking device 6, 6a, 6b.

Figure 2:
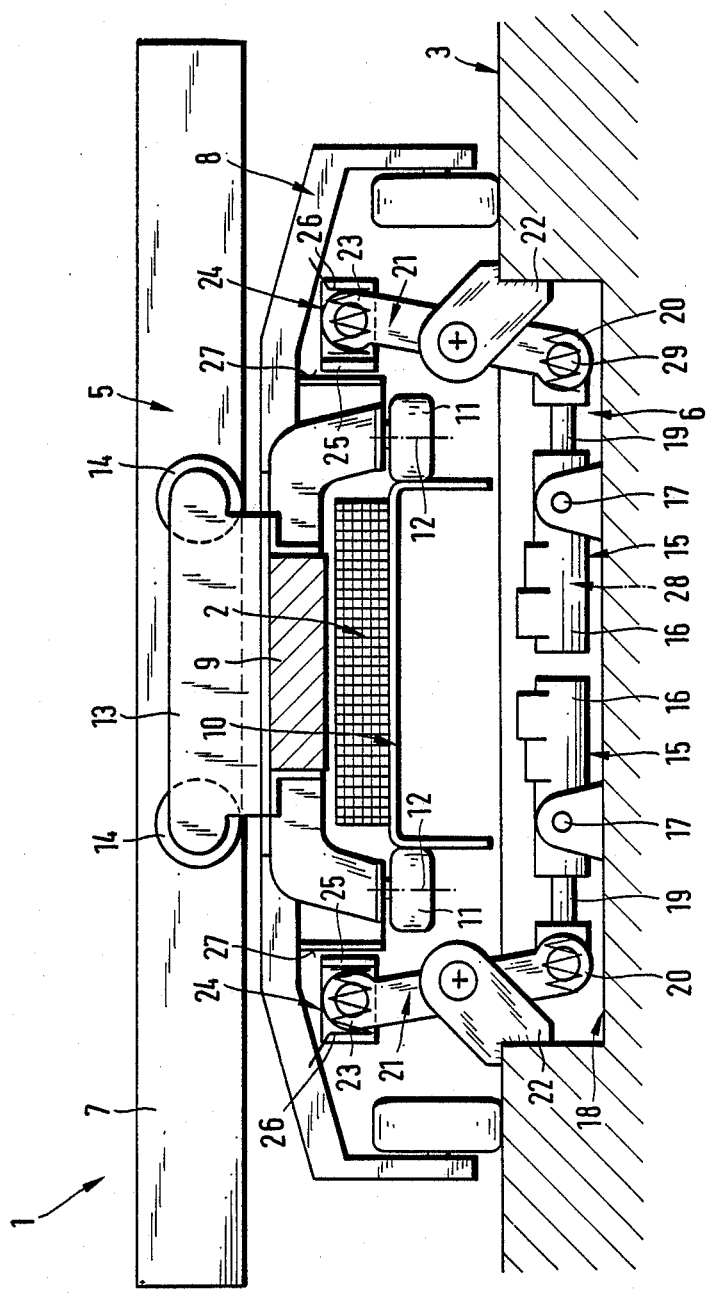
FIG. 2 is a vertical cross-sectional view, on a larger scale, of a first embodiment of the conveying installation according to the present invention shown in FIG. 1 taken along sectional line II—II.
Figure 3:
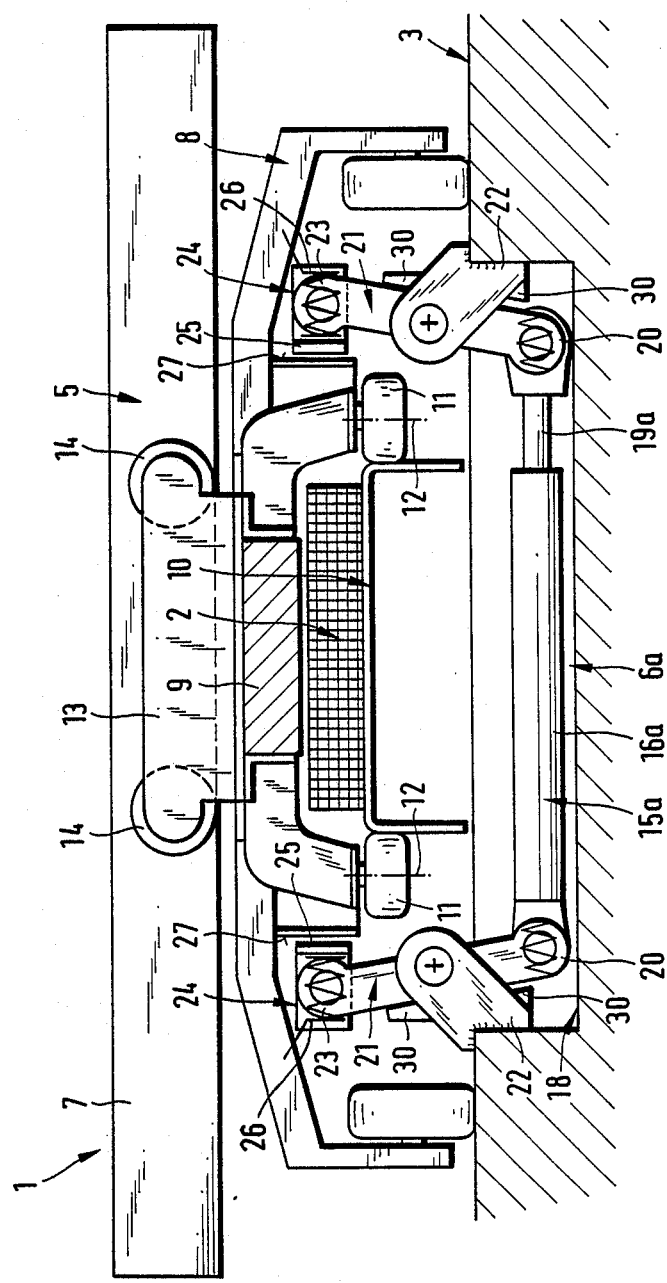
FIG. 3 is a vertical cross-sectional view, on a larger scale, of a second embodiment of the conveying installation according to the present invention shown in FIG. 1 taken along sectional line II—II.
Figure 4:
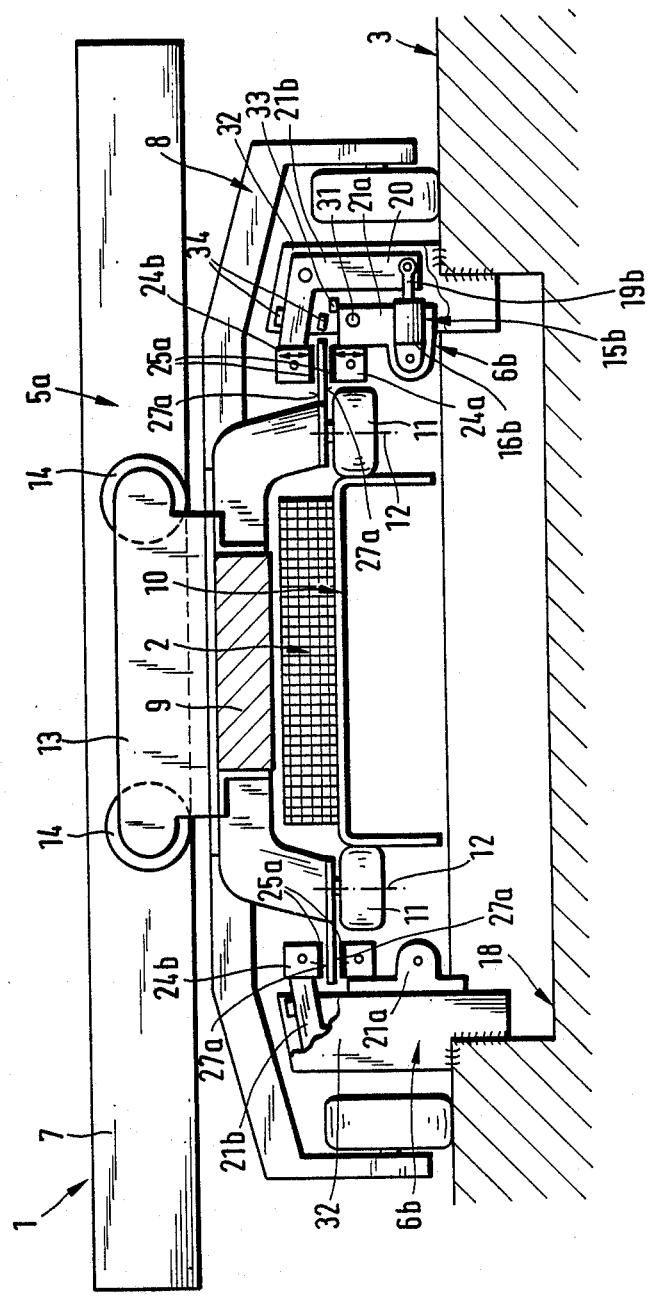
FIG. 4 is a vertical cross-sectional view, on a larger scale, of a third embodiment of the conveying installation according to the present invention shown in FIG. 1 taken along sectional line II—II.

As FIGS. 2–4 show, the conveyor units 5, 5a include conveyor platforms 7. The conveyor units 5, 5a further include undercarriages 8 which roll on travel path 3 and are rotatably arranged relative to conveyor platform 7. For example, two undercarriages 8 may be provided for each conveyor unit 5, 5a. Each conveyor unit 5, 5a includes at least one permanent magnet 9 which is located a small distance above stator 2. Permanent magnet 9 may be mounted in conveyor unit 5, 5a in such a way that it can adapt in an optimum manner to the stator even in tight curves. For example, the permanent magnet 9 can be mounted in such a way that it is rotatable in an end portion about the swivel axis of the undercarriage 8 and is transversely movable i the conveyor platform 7 with the other end portion. The supports necessary for this purpose are denoted with reference numeral 13 and the necessary rollers are denoted with reference numeral 14.

Stator 2 is mounted on a stator support 10 which also serves as the guidance means for the conveyor units 5, 5a. For this purpose, the conveyor units 5, 5a have guide rollers 11 which are rotatable about vertical axes of and rest laterally against the stator support 10.

The braking devices 6 illustrated in FIGS. 1 and 2 assigned to the stator portions 4 each include two electrically operated brake cylinders 15 which are biased by an elastic restoring force, not shown. Brake cylinders 15 including cylinder housing 16 are mounted so as to be pivotable about horizontal axis 17. The brake cylinders 15 extend underneath travel path 3 in recesses 18. The brake cylinders 15 include piston rods 19 which are hinged to the lower ends 20 of two-arm brake levers 21. The brake levers 21 are mounted so as to be pivotable about their middle points. Support brackets 22 for the brake levers 21 are mounted on the travel path 3. The connection 29 between piston rods 19 and brake levers 21 may be a resiliently yielding connection.

Brake shoes with brake lining 25 are hinged to the upper ends 23 of brake levers 21. The brake shoes 24 are supported through spring 26. The conveyor units 5 have on their sides brake surfaces 27 on the same vertical level as the brake linings 25.

The current supply to stator 2 is coupled to the current supply to brake cylinder 15. Thus, as long as current is supplied to stator 2, current is also supplied to brake cylinders 15, so that the brake shoes 24 are located at a distance from brake surfaces 27. When the current supply is interrupted, the brake cylinders 15 are subjected to the elastic restoring force which brings the brake shoes 24 into contact with the brake surfaces 27 and stop the movement of the conveyor unit 5.

When the current supply is resumed, the braking force of each braking device 6 is eliminated, so that, even if travel path 3 includes upwardly and downwardly inclined travel path portions, a uniform movement of all conveyor units 5 can be carried out without danger that the conveyor units 5 roll in undesired directions and bump into each other.

FIG. 2 further shows in dash-dotted lines that it is also possible to use magnets 28 instead of the electrically actuated brake cylinders 15.

The embodiment of the conveying installation 1 according to the present invention illustrated in FIG. 3 differs from that shown in FIG. 2 with respect to the braking device used. While the embodiment of FIG. 2 uses a braking device 6 with two brake cylinders 15 or two magnets 28, in the embodiment of FIG. 3 the brake levers 21 are actuated by a common brake cylinder 15a of a braking device 6a.

Brake cylinder 15a is also accommodated in a recess 18 in travel path 3. Brake cylinder 15a is mounted in a floating manner with the cylinder housing 16a being hinged to the lower end 20 of the brake lever 21 on one side of stator 2 and the piston rod 19a being hinged to the lower end 20 of the brake lever 21 provided on the other side of the stator 2.

The pivoting movement of brake lever 21 is limited by stops 30.

In the embodiment of the invention shown in FIG. 4, the braking devices 6b are arranged on the sides of stator 2. Each braking device 6b includes a brake cylinder 15b which extends essentially horizontally. Cylinder housing 16b is hinged to a counterbrake lever 21a which is pivotally mounted about a horizontal axis 31 on an abutment housing 32 fastened on the travel path 3. The pivoting movements of the counterbrake lever 21a are limited by stops 33.

Brake shoes 24a are fastened to the other end of counterbrake lever 21a. Brake shoes 24a are provided with brake linings 25a which can come into contact with the underside of brake surfaces 27a. Brake surfaces 27a project horizontally from the conveyor unit 5a.

The piston rods 19b of the brake cylinder 15b are hinged to the lower ends 20 of brake levers 21b. The upper ends are provided with brake shoes 24b which can come into contact with the brake linings 25a at the upper sides of the brake surfaces 27a. The pivoting movements of the brake lever 21b are limited by stops 34.

While specific embodiments of the invention have been shown and described in detail to illustrate the application of the inventive principles, it will be understood that the invention may be embodied otherwise without departing from such principles.

We claim:

1. A conveying installation with a linear motor drive, comprising a plurality of stator portions placed one behind the other along a travel path and at least one conveyor unit with at least one permanent magnet, the conveyor unit being guided along the stator portions in a constrained manner, each conveyor unit having braking surfaces, and each stator portion including at least one stationary braking device which is capable of interacting with the braking surfaces of the conveyor units.

2. The conveying installation according to claim 1, wherein at least two conveyor units are spaced apart from each other and are capable of sequential displacement on the travel path, the stator portions having a length which is shorter than the spacing between the conveyor units.

3. The conveying installation according to claim 1, wherein the stator portions are connected to a current supply and the braking devices are directly dependent upon the current supply of the stator portions.

4. The conveying installation according to claim 1, wherein each braking device includes at least one brake shoe, the brake shoe being operated by means of a brake cylinder.

5. The conveying installation according to claim 4, wherein the braking device includes a two-arm brake lever, the lever having upper and lower ends, the brake shoe being hinged to the upper end and the brake cylinder being connected in an articulated manner to the lower end.

6. The conveying installation according to claim 5, wherein the brake shoe is mounted on the upper end of the brake lever in a resilient manner.

7. The conveying installation according to claim 5, wherein the connection between the brake lever and the brake cylinder is a resiliently yielding connection.

8. The conveying installation according to claim 4, wherein the brake cylinder includes a housing, the housing being attached to a horizontal axis, the housing being pivotable about the horizontal axis.

9. The conveying installation according to claim 4, wherein the brake cylinder is capable of being operated electrically against the restoring force of a spring.

10. The conveying installation according to claim 1, wherein each braking device includes at least one brake shoe, a magnet being provided for the operation of the brake shoe.

* * * * *